United States Patent
Pritchett, II

(10) Patent No.: US 9,763,371 B2
(45) Date of Patent: Sep. 19, 2017

(54) ROTATABLE SHOVEL HANDLE

(71) Applicant: Philenza Joe Pritchett, II, Bluffton, SC (US)

(72) Inventor: Philenza Joe Pritchett, II, Bluffton, SC (US)

(*) Notice: Subject to any disclaimer, the term of this patent is extended or adjusted under 35 U.S.C. 154(b) by 0 days.

(21) Appl. No.: 15/175,391

(22) Filed: Jun. 7, 2016

(65) Prior Publication Data

US 2016/0353651 A1   Dec. 8, 2016

Related U.S. Application Data

(60) Provisional application No. 62/172,458, filed on Jun. 8, 2015.

(51) Int. Cl.
*A01B 1/02* (2006.01)

(52) U.S. Cl.
CPC .................................. *A01B 1/026* (2013.01)

(58) Field of Classification Search
CPC .................................. A01B 1/026; A01B 1/02
USPC .................... 294/58, 59, 57, 178; 16/426
See application file for complete search history.

(56) References Cited

U.S. PATENT DOCUMENTS

| | | | | |
|---|---|---|---|---|
| 5,054,830 A | * | 10/1991 | Nisenbaum | B25G 1/00 16/426 |
| 5,499,852 A | * | 3/1996 | Seigendall | A01B 1/026 294/54.5 |
| 6,283,522 B1 | * | 9/2001 | Renaud | B25G 1/00 294/58 |
| 6,464,272 B1 | * | 10/2002 | Michaud | A01B 1/026 16/430 |
| 8,757,688 B1 | * | 6/2014 | Hajek | A01B 1/026 294/57 |
| 2003/0057721 A1 | * | 3/2003 | Ducklow | A01B 1/026 294/58 |
| 2003/0074765 A1 | * | 4/2003 | Quimby | A01B 1/00 16/426 |
| 2005/0206178 A1 | * | 9/2005 | Hoeft | A01B 1/026 294/58 |
| 2008/0196205 A1 | * | 8/2008 | Hixon | A01B 1/026 16/426 |

* cited by examiner

*Primary Examiner* — Gabriela Puig
(74) *Attorney, Agent, or Firm* — Ward and Smith, P.A.; Ryan K. Simmons

(57) ABSTRACT

A rotatable shovel handle assembly for mounting on a shovel including, a rotatable grip portion; and a lift handle portion hingedly attached to the rotatable grip portion. Wherein, the rotatable grip portion includes a base sleeve portion and a rotatable sleeve portion, and wherein the rotatable sleeve portion is disposed about the base sleeve portion and adapted to rotate thereabout.

19 Claims, 5 Drawing Sheets

ROTATABLE SHOVEL HANDLE

RELATED APPLICATIONS

This application is related to and claims priority to U.S. Provisional Patent Application No. 62/172,458, filed on Jun. 8, 2015, entitled "Rotatable Shovel Handle", the entire disclosure of which is incorporated herein by reference.

FIELD OF THE INVENTION

This invention pertains generally to an improved shovel handle, more particularly, a rotatable shovel handle.

BACKGROUND OF THE INVENTION

Most standard shovels have a substantially straight pole style handle. The use of a standard shovel can often be physically strenuous, especially for the elderly and people with back/shoulder problems. Also, while using a standard shovel a user's hands can be fatigued and damaged (e.g., blisters and calloused), especially over long term use or when working with difficult digging environments (e.g., hard clay, dense soil).

There is a need for an improved shovel handle capable of rotating about the shovel handle.

There is also a need for an improved shovel handle including an extendable lift handle.

BRIEF DESCRIPTION OF THE INVENTION

In one embodiment the invention provides a rotatable shovel handle. The rotatable shovel handle may include a rotatable grip portion; and a lift handle portion hingedly attached to the rotatable grip portion. The rotatable grip portion may include a base sleeve portion and a rotatable sleeve portion, and wherein the rotatable sleeve portion may be disposed about the base sleeve portion and adapted to rotate thereabout. An inner diameter of the rotatable sleeve portion may be larger than an outer diameter of the base sleeve portion. The base sleeve portion may include locking portions disposed at opposing ends of the base sleeve portion. The locking portions may include compression locking rings. The rotatable sleeve portion may be positioned between the locking portions disposed at opposing ends of the base sleeve portion, and wherein the locking portions may be adapted to prevent the rotatable sleeve portion from moving in an up or down direction relative to a shovel handle upon which it is mounted. The locking portions may be configured to secure the rotatable grip portion to a shovel handle upon which it is mounted. The base sleeve portion may be stationary when mounted to a shovel handle while the rotatable grip portion may be rotatable about the base sleeve portion. The base sleeve portion and rotatable grip portion may include a rigid or semi-rigid material. The rotatable grip portion may include an outer grip layer of soft or semi-soft material. The rotatable grip portion further may include one or more inner ball bearing rings integrated with one or both of the base sleeve portion and rotatable grip portion, and wherein the one or more inner ball bearing rings may be disposed between the base sleeve portion and rotatable grip portion. The lift handle portion may be hingedly mounted at its first end to the rotatable sleeve portion. The lift handle portion may be extendable from in the range of about 0° to about 180° relative to the rotatable sleeve portion. The lift handle portion may be extendable from in the range of about 0° to about 90° relative to the rotatable sleeve portion. The lift handle portion may include a lift handle grip portion at a second end opposite that of the first end. The handle grip portion may include a rigid or semi-rigid material. The handle grip portion may include an outer grip layer of soft or semi-soft material. The handle grip portion may be rotatable. The lift handle portion may include a locking mechanism to lock the lift handle portion in a certain position. The lift handle portion may include a locking mechanism to prevent the lift handle portion from extending past a certain angle relative to the rotatable grip portion.

These and other embodiments will be apparent from the ensuing specification.

BRIEF DESCRIPTION OF THE DRAWINGS

Figure 1:
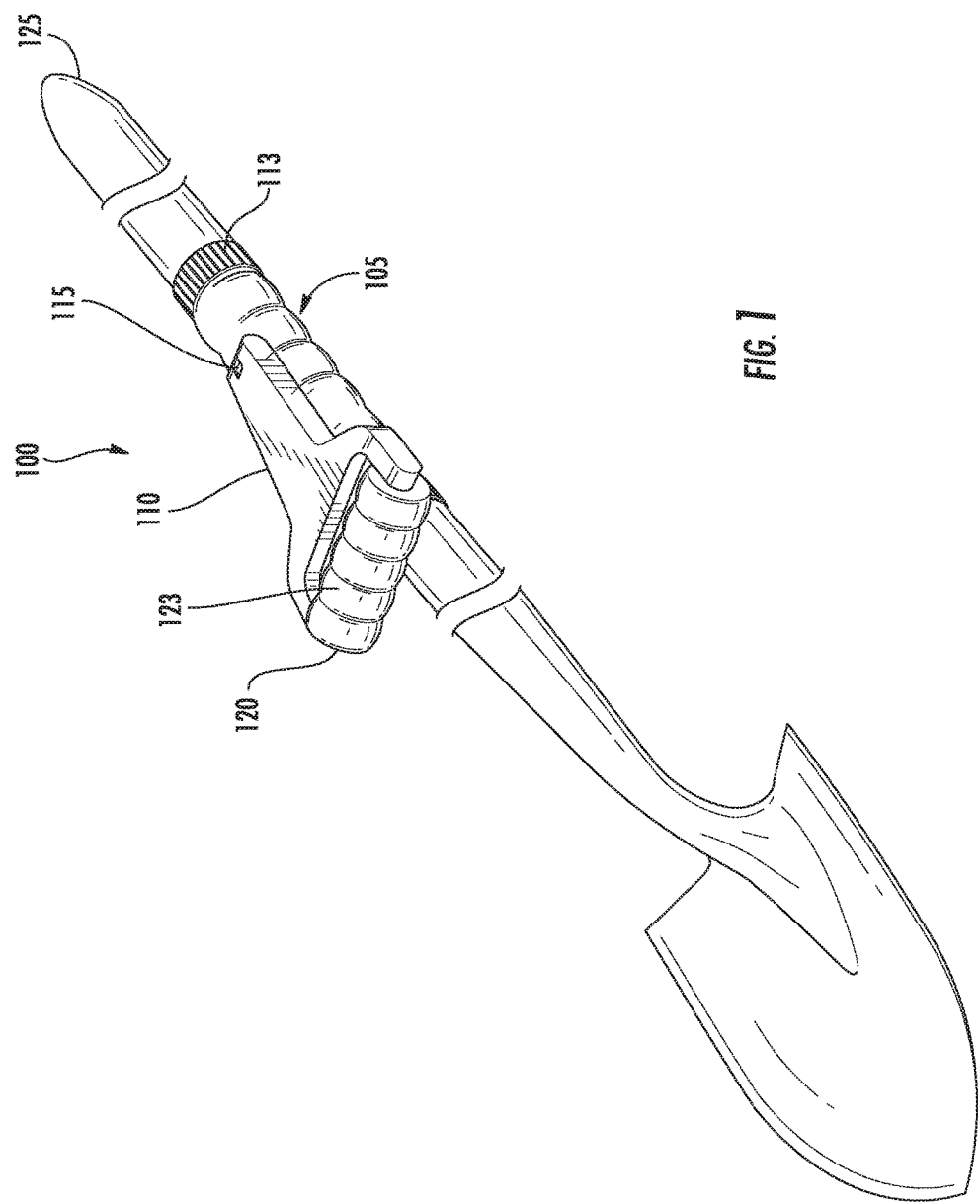

Having thus described the presently disclosed subject matter in general terms, reference will now be made to the accompanying Drawings, which are not necessarily drawn to scale, and wherein:

FIG. 1 illustrates a rotatable shovel handle in accordance with an embodiment of the invention.

Figure 2:
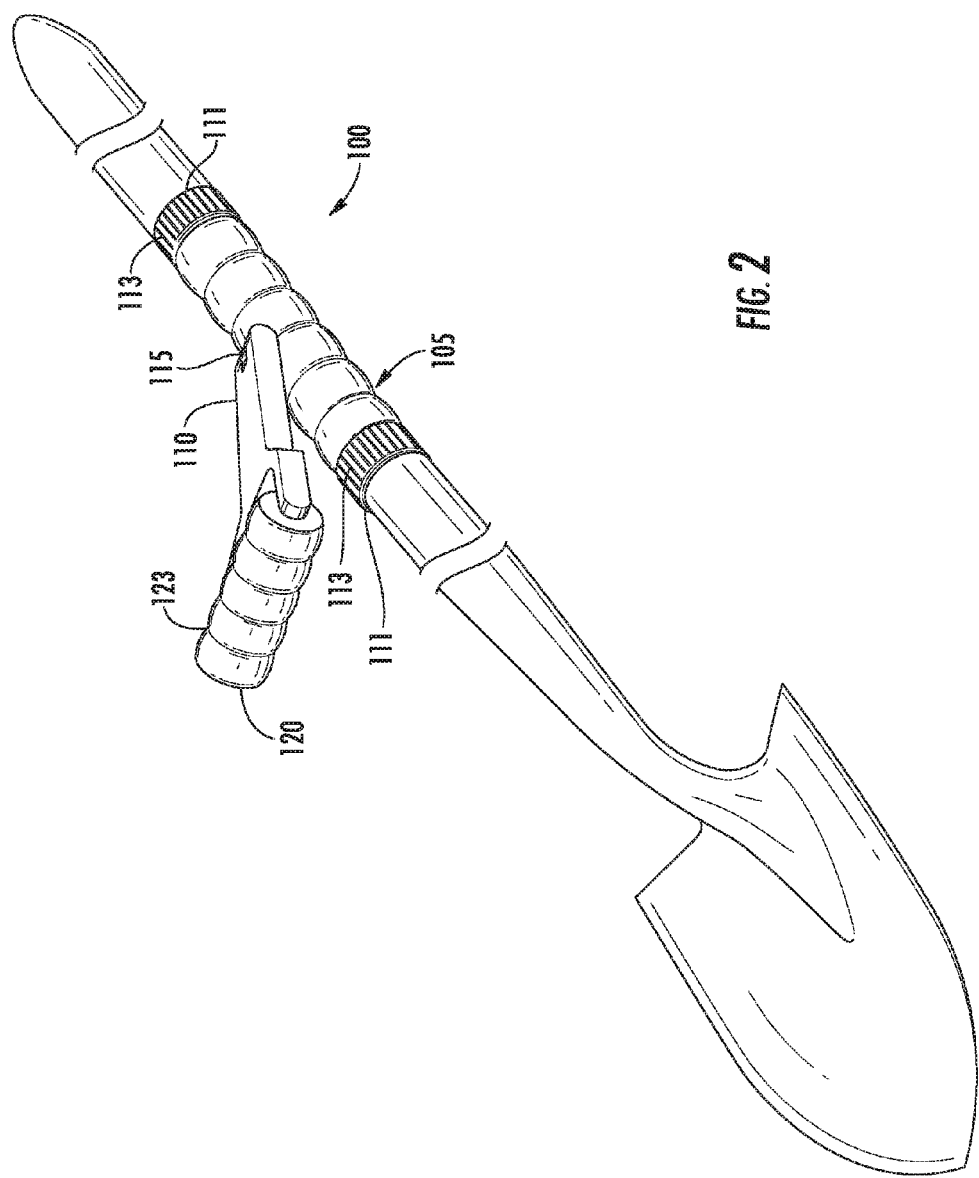

FIG. 2 illustrates a rotatable shovel handle in accordance with another embodiment of the invention.

Figure 3A:
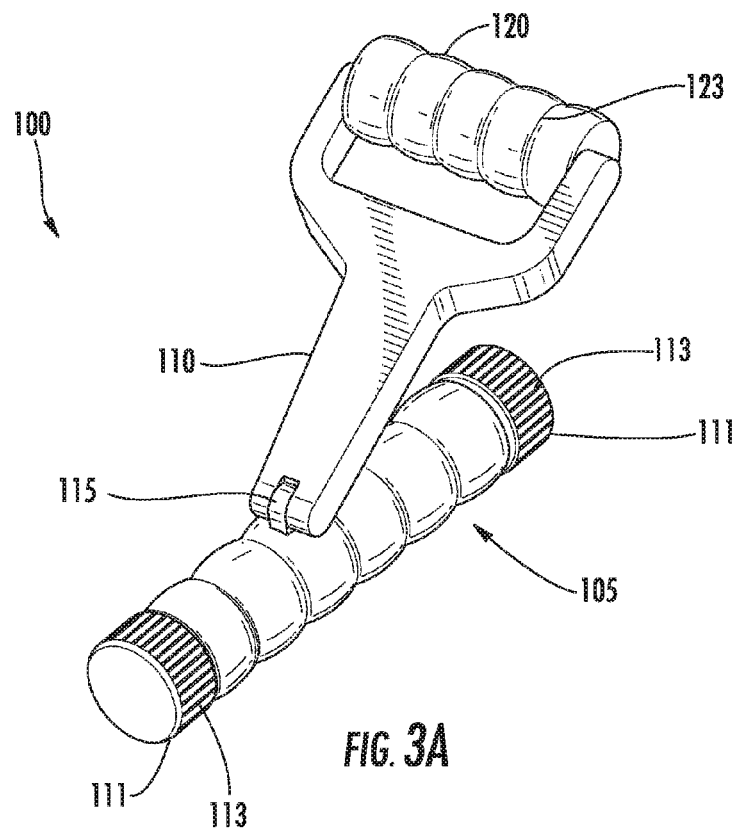
Figure 3B:
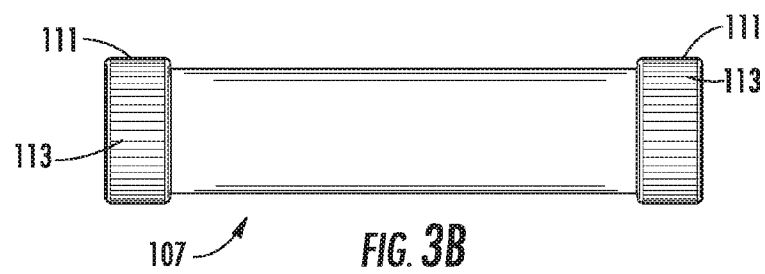
Figure 3C:
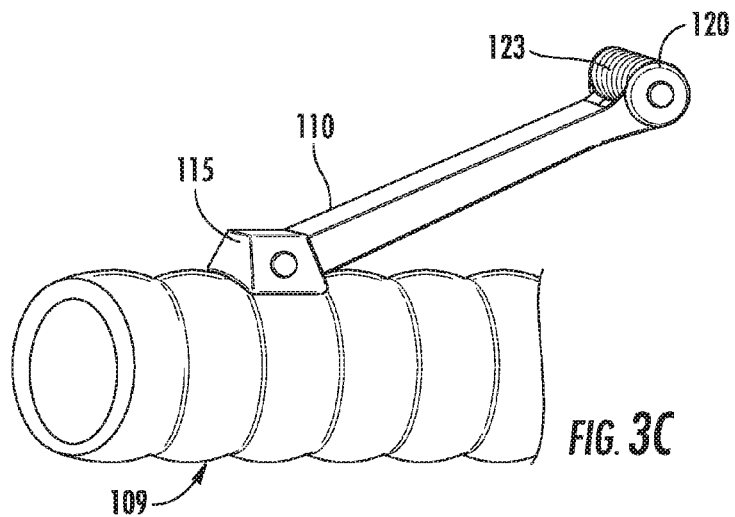

FIGS. 3A, 3B, and 3C illustrate a rotatable grip and lift handle portions of a rotatable shovel handle in accordance with an embodiment of the invention.

Figure 4:
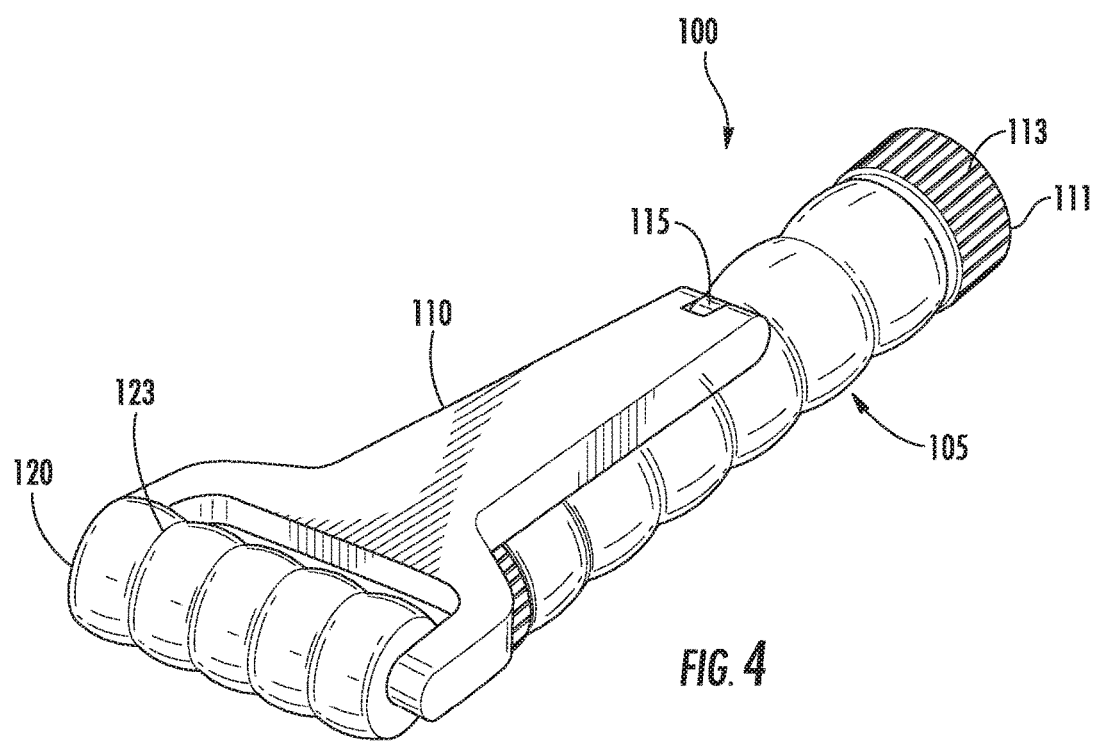

FIG. 4 illustrates a grip portion of a rotatable shovel handle in accordance with another embodiment of the invention.

Figure 5:
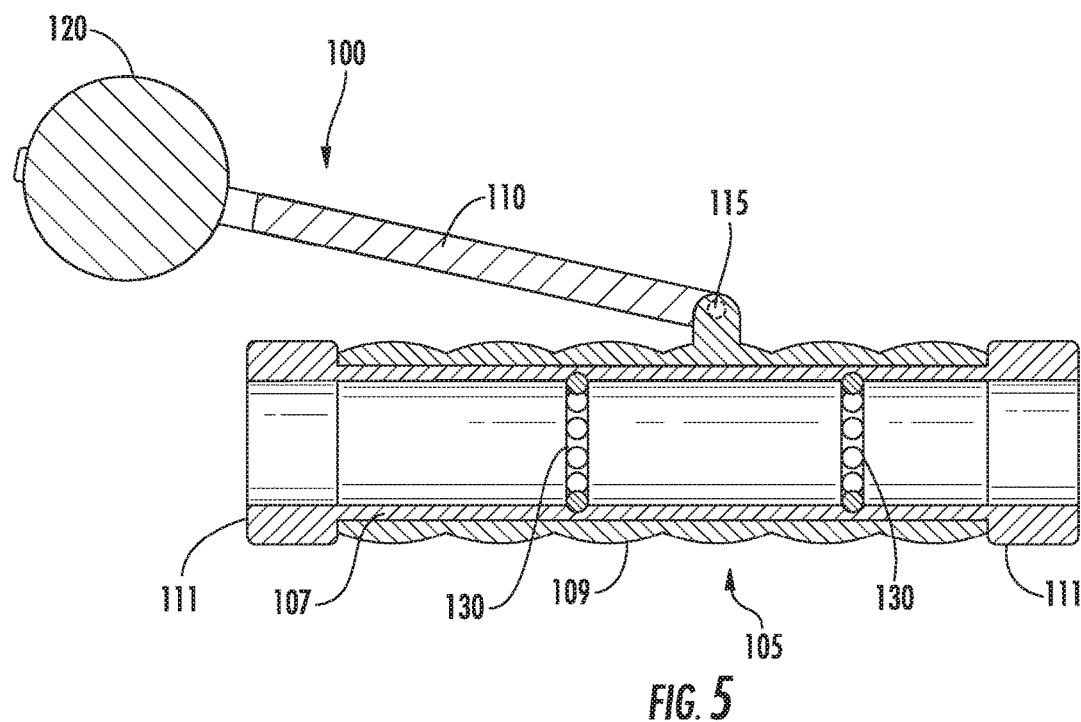

FIG. 5 illustrates a cross section view of a grip portion of a rotatable shovel handle in accordance with an embodiment of the invention.

DETAILED DESCRIPTION OF THE INVENTION

The presently disclosed subject matter now will be described more fully hereinafter with reference to the accompanying Drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof.

With reference to FIGS. 1-5 a rotatable shovel handle 100 is provided. Rotatable shovel handle 100 preferably includes a rotatable grip 105 and a lift handle 110. Lift handle 110 may be hingedly attached to rotatable grip 105 by a lift handle hinge 115.

Rotatable grip 105 may include a base sleeve 107 and a rotatable sleeve 109. Base sleeve 107 may further include locking portions 111, for securing secure rotatable grip 105 to a shovel handle 125, such as standard hand shovel, garden shovel, or the like. Locking portions 111 may be compression lock rings, twist-locks, or other suitable mechanism, disposed at opposing ends of base sleeve 107. Locking portions 111 may optionally include grooves 113 to facilitate gripping by a user.

In one embodiment, base sleeve 107 is sized and configured to be mounted on shovel handle 125. Base sleeve 107 is preferably mounted such that it is non-rotatable about shovel handle 125, and preferably secured in position by locking portions 111. Rotatable sleeve 109 is sized and configured to fit over base sleeve 107 occupy a space between locking portions 111, wherein the inner diameter of rotatable sleeve 109 is slightly larger than the outer diameter of base sleeve 107, thereby allowing rotatable sleeve 109 to rotate about base sleeve 107. In one example, rotatable sleeve 109 is disposed between locking portions 111, wherein the locking portions 111 have an outer diameter such that they prevent the rotatable sleeve 109 from moving past locking portions 111 in either the up or down direction, while still allowing rotatable sleeve 109 to rotate about base sleeve 107.

In an alternative embodiment, one or both of locking portions 111 may be removable, thus allowing rotatable sleeve 109 to be slid into place over base sleeve 107. Once rotatable sleeve 109 is in position the removed one or both of locking portions 111 may be installed to the end portions of base sleeve 107 to secure rotatable sleeve 109 in position, preventing it from moving up and down while still allowing it to rotate about base sleeve 107. In one example, base sleeve 107 is longer than that of rotatable sleeve 109 to allow locking portions 111 to attach to ends thereof. In one embodiment, base sleeve 107 may include threads on its end portions to allow for locking portions 111, which may include corresponding threads to attach thereto.

Base sleeve 107 may be attached to shovel handle 125 using locking portions 111, or for example using another suitable mechanism, such as, pressure/elastic fit, adjustable clamp(s), and/or the like. Base sleeve 107 and/or rotatable sleeve 109 may be made of any suitable material and preferable may be made of a rigid hard cased or semi-rigid material, such as plastic, metal, hard rubber, or other suitable material. Rotatable sleeve 109 may have a grip pad on its outer surface made of a soft or semi-soft material, such as foam, neoprene, rubber, or the like. For example, rotatable sleeve 109 may have a rigid inner portion and have a layer of soft or semi-soft material (e.g., foam, neoprene, rubber, or the like) on an outer portion for gripping by a user's hand. Rotatable grip 105 may further include a mechanism to facilitate rotatable sleeve 109 to rotate about base sleeve 107. In one example, a small space between rotatable sleeve 109 and base sleeve 107 allows rotatable sleeve 109 to rotate about base sleeve 107. In another embodiment, rotatable grip 105 may further include one or more inner ball bearing rings 130 integrated with base sleeve 107 and/or rotatable grip 109 and positioned between rotatable sleeve 109 and base sleeve 107 allowing rotatable sleeve 109 to rotate about base sleeve 107.

Lift handle 110 is preferably hingedly attached to rotatable sleeve 109 by a lift handle hinge 115. Lift handle hinge 115 may be a rod/bolt style hing, or any other suitable hinge mechanism made of durable material. Lift handle 110 may be in a folded or one or more extended positions. In the folded position lift handle 110 is substantially parallel and flush with shovel handle 125. Lift handle 110 may be extended to one or more extended positions in the range of about greater than 0° to about 90°, for example 30°, 45°, 60°, 90°, and/or other angle relative to shovel handle 125. Lift handle 110 may be secured/locked in the folded position or in one or more of the extended positions using any suitable securing/locking mechanism, such as a clip, pin, ratchet/gear, or other suitable mechanism. In one embodiment, rotatable shovel handle 100 may include a stop mechanism, such as a stop block, clip, pin, ratchet/gear, or other suitable mechanism, to prevent lift handle 110 from extending past a certain point, for example, greater than about 90° relative to shovel handle 125.

Lift handle 110 may further include a lift handle grip 120. Lift handle grip 120 may be made of a combination of a soft or semi-soft material and a rigid material. For example, lift handle grip 120 may have a rigid inner portion (e.g., plastic, hard rubber, wood, or other suitable material) and have a layer of soft or semi-soft material (e.g., foam, neoprene, rubber, or other suitable material) on an outer portion for gripping by a user's hand. Lift handle grip 120 may optionally include grooves 123 on the outer layer of soft or semi-soft material to facilitate gripping by a user. Lift handle grip 120 may be rotatable. In one example, the rigid inner portion of lift handle grip 120 may include a hollow inner core and be disposed about a rod (not shown), wherein the inner diameter of the hollow inner core is slightly larger than the outer diameter of the rod, thus allowing lift handle grip 120 to rotate about the rod.

In one embodiment, rotatable shovel handle 100 may be added to an existing shovel handle 125 by sliding the rotatable shovel handle 100 onto shovel handle 125 and securing in place by using locking portions 111 or other a suitable securing/attachment mechanism, such as, pressure/elastic ring, adjustable clamp, and/or the like. In an alternative embodiment, rotatable shovel handle 100 may be integral with shovel handle 125.

Although the foregoing subject matter has been described in some detail by way of illustration and example for purposes of clarity of understanding, it will be understood by those skilled in the art that certain changes and modifications can be practiced within the scope of the description herein.

Following long-standing patent law convention, the terms "a," "an," and "the" refer to "one or more" when used in this application. Thus, for example, reference to "a subject" includes a plurality of subjects, unless the context clearly is to the contrary (e.g., a plurality of subjects), and so forth.

Throughout this specification, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and figures, unless otherwise indicated, all numbers expressing amounts, sizes, dimensions, proportions, shapes, formulations, parameters, percentages, parameters, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

What is claimed is:

1. A rotatable shovel handle assembly, comprising:
   a. a rotatable grip portion; and
   b. a lift handle portion hingedly attached to the rotatable grip portion; wherein the rotatable grip portion comprises a base sleeve portion and a rotatable sleeve portion, and wherein the rotatable sleeve portion is disposed about the base sleeve portion and adapted to rotate thereabout.

2. The rotatable shovel handle assembly of claim 1 wherein an inner diameter of the rotatable sleeve portion is larger than an outer diameter of the base sleeve portion.

3. The rotatable shovel handle assembly of claim 1 wherein the base sleeve portion comprises locking portions disposed at opposing ends of the base sleeve portion.

4. The rotatable shovel handle assembly of claim 3 wherein the locking portions comprise compression locking rings.

5. The rotatable shovel handle assembly of claim 3 wherein the rotatable sleeve portion is positioned between the locking portions disposed at opposing ends of the base sleeve portion, and wherein the locking portions are adapted to prevent the rotatable sleeve portion from moving in an up or down direction relative to a shovel handle upon which it is mounted.

6. The rotatable shovel handle assembly of claim 3 wherein the locking portions are configured to secure the rotatable grip portion to a shovel handle upon which it is mounted.

7. The rotatable shovel handle assembly of claim 1 wherein the base sleeve portion is stationary when mounted to a shovel handle while the rotatable grip portion is adapted to be rotatable about the base sleeve portion.

8. The rotatable shovel handle assembly of claim 1 wherein the base sleeve portion and rotatable grip portion comprise a rigid or semi-rigid material.

9. The rotatable shovel handle assembly of claim 8 wherein the rotatable grip portion comprise an outer grip layer of soft or semi-soft material.

10. The rotatable shovel handle assembly of claim 1 wherein the rotatable grip portion further comprises one or more inner ball bearing rings integrated with one or both of the base sleeve portion and rotatable grip portion, and wherein the one or more inner ball bearing rings are disposed between the base sleeve portion and rotatable grip portion.

11. The rotatable shovel handle assembly of claim 1 wherein the lift handle portion is hingedly mounted at a first end to the rotatable sleeve portion.

12. The rotatable shovel handle assembly of claim 11 wherein the lift handle portion is extendable from in the range of about 0° to about 180° relative to the rotatable sleeve portion.

13. The rotatable shovel handle assembly of claim 11 wherein the lift handle portion is extendable from in the range of about 0° to about 90° relative to the rotatable sleeve portion.

14. The rotatable shovel handle assembly of claim 1 wherein the lift handle portion comprises a lift handle grip portion at a second end opposite that of the first end.

15. The rotatable shovel handle assembly of claim 14 wherein the handle grip portion comprises a rigid or semi-rigid material.

16. The rotatable shovel handle assembly of claim 15 wherein the handle grip portion comprise an outer grip layer of soft or semi-soft material.

17. The rotatable shovel handle assembly of claim 15 wherein the handle grip portion is rotatable.

18. The rotatable shovel handle assembly of claim 1 wherein the lift handle portion comprises a locking mechanism to lock the lift handle portion in a certain position.

19. The rotatable shovel handle assembly of claim 1 wherein the lift handle portion comprises a locking mechanism to prevent the lift handle portion from extending past a certain angle relative to the rotatable grip portion.

* * * * *